Dec. 12, 1944.  J. S. KAZANTZEFF  2,364,722
INCUBATOR
Filed Oct. 23, 1942

Inventor
John S. Kazantzeff
BY Featherston Laughly
Attys.

Patented Dec. 12, 1944

2,364,722

UNITED STATES PATENT OFFICE 2,364,722

INCUBATOR

John Stephen Kazantzeff, Abbotsford, British Columbia, Canada

Application October 23, 1942, Serial No. 463,128
In Canada October 28, 1941

8 Claims. (Cl. 119—37)

This invention relates to improvements in incubators.

An object of the present invention is the provision of an incubator in which an even temperature is maintained at all points.

Another object is the provision of an incubator in which all the air is warmed therein and then distributed without unduly raising the temperature at any one point.

Another object is the provision of an incubator including improved means for humidifying the air circulating therein.

A further object is the provision of novel means for heating the air circulating in an incubator.

A still further object is the provision of a device of the nature described of very simple construction and which may be easily operated.

Figure 1:
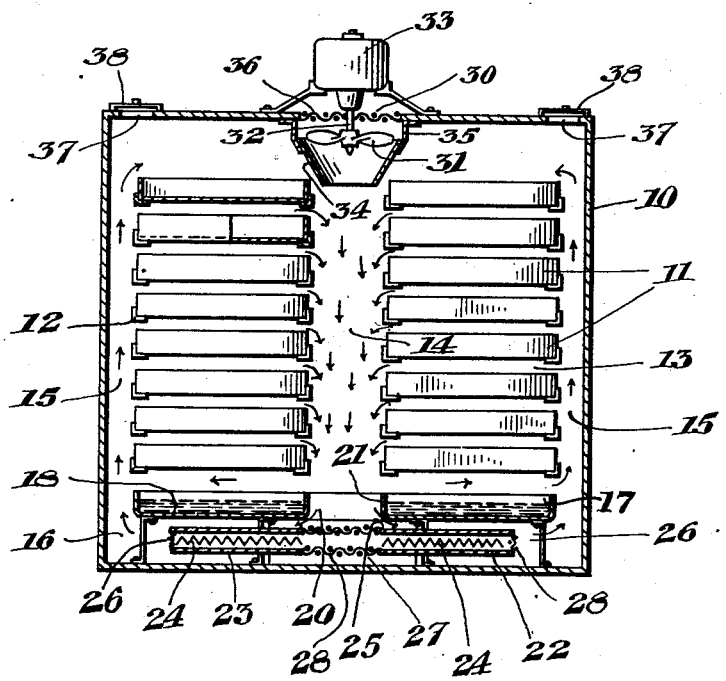
Figure 2:
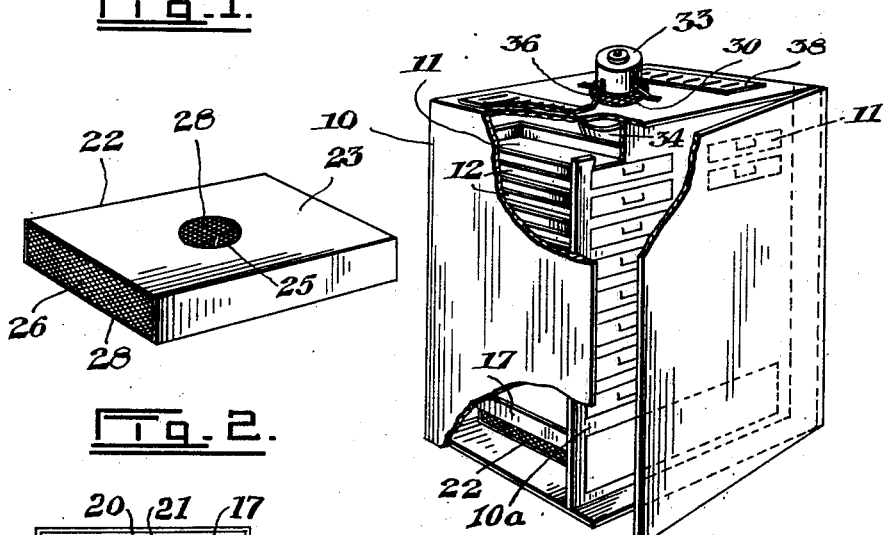
Figure 3:
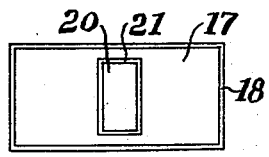
Figure 4:

With these and other objects in view, the present invention consists essentially of an incubator comprising a casing, a plurality of trays arranged in stacks in the casing, the trays of each stack being spaced one above the other, an inner vertical passage between two stacks, vertical passages at the outer sides of the stacks, the spaces between the trays of each stack communicating with the inner and outer passages at the sides thereof, a heater at the bottom of the casing, and means for directing air downwardly through the inner passage to the heater, said air rising in the outer passages and some of it being drawn through the spaces between the trays by suction created by the downward movement of the air in the inner passage, as more fully described in the following specification and illustrated in the accompanying drawing, in which Figure 1 is a vertical section through the incubator, Figure 2 is an enlarged perspective view of the heater for the incubator, Figure 3 is a perspective view, partly broken away, of the incubator, and Figure 4 is a reduced plan view of the humidifier of the incubator.

Referring more particularly to the drawing, 10 is a casing in which a plurality of trays 11 are arranged in stacks 12, the trays of each stack being spaced one above the other to form spaces 13 therebetween. An inner vertical passage 14 is formed between the stacks 12 centrally of the casing 10 and vertical passages 15 are formed at the outer sides of the stacks between said stacks and the walls of the casing the front face of each of the trays is supported in a vertical wall 10a.

The lowermost trays 11 are spaced from the bottom of the casing 10 to form an area 16 in which a humidifier 17 is located. This humidifier consists of a pan 18 mounted beneath the stacks 11. This pan has an opening 20 in the bottom centrally thereof and a collar 21 surrounding said opening projects upwardly into the pan. The opening 20 is located beneath the central passage 14.

A heater 22 is provided beneath the pan 18 and spaced above the bottom of the casing 10. This heater consists of a case 23 having a heating element therein. In this example, the heating element comprises an electrical heating element 24 arranged in the case. An opening 25 is formed in the top of the case 23 centrally thereof beneath the opening 20 of the pan 18 and the central passage 14, while openings 26 are formed in the ends of the case adjacent the outer passages 15. If desired, an opening 27 may be formed in the bottom of the case beneath the opening 25. The openings 25, 26 and 27 are preferably covered by screening means 28.

An orifice 30 is formed in the top of the casing 10 over the central passage 14 and a fan 31 is positioned below said orifice. The fan 31 is mounted on a shaft 32 extending through the orifice 30 to a motor 33 mounted on the top of the casing. An inverted truncated cone 34 is suspended from the casing top by straps 35, the lower end of said cone extending into the passage 14. The fan 31 is positioned in the cone at its upper end. Screening means 36 covers the orifice 30.

Apertures 37 are formed in the top of the casing 10 over the outer passages 15. Suitable means is provided for controlling the amount of air passing through the apertures 37, such as, for example, shutters 38.

In use, the eggs to be hatched are placed in the trays 11. The fan 31 and the cone 34 direct air downwardly through the inner central passage 14 to the humidifier 17 and the heater 22. Some of this air is deflected across the top of the pan 18 which is filled with water. The rest of the air enters the case 23 through the opening 25 and some of it is directed horizontally around the heating element 24 and through the end openings 26. The remainder of the air passes through the bottom opening 27 and moves along the bottom of the casing 10. All the air from above the pan 18, from the case 23 and from below said case mixes and rises in the outer passages 15. The movement of the air downwardly through the central passage creates a suction which draws air from the passages 15 through the spaces 13 between the trays 11 to warm the eggs thereon.

The heater warms the water in the humidifier and the latter shields the trays from the heat of the former. Air moving across the top of the pan 18 absorbs moisture and assists in preventing the lowermost trays from becoming too hot. The portion of the air passing through the case 23 absorbs sufficient heat to keep the total volume of air at the desired temperature. The air drawn from the outer passages between the trays is of a uniform temperature so that all the eggs are subjected to substantially the same amount of heat. The shutters 38 may be opened or closed to control the temperature in the casing 10 and to regulate the amount of air to be recirculated through the casing.

The fan draws fresh air in through the orifice 30 while air is also drawn over the upper end of the cone 34 from the sides of the casing. Additional air from the sides of casing is directed through the central passage by the sloping side of the cone. Warm air from the sides of the casing preheats any fresh air drawn into the casing.

From the above, it will readily be seen that an incubator of simple construction has been provided in which an even temperature is maintained at all points and including improved and simple means for heating and humidifying the air circulating therein.

Various modifications may be made in this invention without departing from the spirit thereof or the scope of the claims, and therefore the exact forms shown are to be taken as illustrative only and not in a limiting sense, and it is desired that only such limitations shall be placed thereon as are disclosed in the prior art or are set forth in the accompanying claims.

What I claim as my invention is:

1. An incubator comprising a casing, a plurality of trays arranged in stacks in the casing, the trays of each stack being spaced one above the other and above the casing bottom, a central vertical passage between the stacks, a vertical passage between the outer edge of each stack and the casing wall, the spaces between the trays of each stack communicating with the central and outer passages, a humidifier beneath the stacks, means in the humidifier for permitting air to pass therethrough, a heater beneath the humidifier, and means for directing air downwardly through the central passage and the humidifier to the heater, said air rising in the outer passages and some of it being drawn through the spaces between the trays by suction created by the downward movement of the air in the central passage.

2. An incubator comprising a casing, a plurality of trays arranged in stacks in the casing, the trays of each stack being spaced one above the other and above the casing bottom, a central vertical passage between the stacks, a vertical passage between the outer edge of each stack and the casing wall, the spaces between the trays of each stack communicating with the central and outer passages, a water pan beneath the stacks, said pan having an opening therethrough beneath the central passage, a collar in the pan around said opening, a heater beneath the pan, and means for directing air downwardly through the central passage and the pan to the heater, said air rising in the outer passages and some of it being drawn through the spaces between the trays by suction created by the downward movement of the air in the central passage.

3. An incubator comprising a casing, a plurality of trays arranged in stacks in the casing, the trays of each stack being spaced one above the other and above the casing bottom, a central vertical passage between the stacks, a vertical passage between the outer edge of each stack and the casing wall, the spaces between the trays of each stack communicating with the central and outer passages, a case beneath the stacks, a heating element in the case, an opening in the top of the case beneath the central passage, openings in each end of the case adjacent the outer passages, and means for directing air downwardly through the central passage and the opening in the case top, said air rising in the outer passages and some of it being drawn through the spaces between the trays by suction created by the downward movement of the air in the central passage.

4. An incubator comprising a casing, a plurality of trays arranged in stack in the casing, the trays of each stack being spaced one above the other and above the casing bottom, a central vertical passage between the stacks, a vertical passage between the outer edge of each stack and the casing wall, the spaces between the trays of each stack communicating with the central and outer passages, a water pan beneath the stacks, said pan having an opening therethrough beneath the central passage, a collar in the pan around said opening, a case beneath the pan, a heating element in the case, an opening in the top of the case beneath the pan opening, openings in each end of the case adjacent the outer passages, and means for directing air downwardly through the central passage and the opening in the case top, said air rising in the outer passages and some of it being drawn through the spaces between the trays by suction created by the downward movement of the air in the central passage.

5. An incubator comprising a casing, a plurality of trays arranged in stacks in the casing, the trays of each stack being spaced one above the other and above the casing bottom, a central vertical passage between the stacks, a vertical passage between the outer edge of each stack and the casing wall, the spaces between the trays of each stack communicating with the central and outer passages, a water pan beneath the stacks, said pan having an opening therethrough beneath the central passage, a collar in the pan around said opening, a case beneath the pan, a heating element in the case, openings in the top and bottom of the case beneath the pan opening, openings in each end of the case adjacent the outer passages, screening means over the openings in the case, and means for directing air downwardly through the central passage, the pan and the case, said air rising in the outer passages and some of it being drawn through the spaces between the trays by suction created by the downward movement of the air in the central passage.

6. An incubator comprising a casing, a plurality of trays arranged in stacks in the casing, the trays of each stack being spaced one above the other, a central vertical passage between the stacks, a vertical passage between the outer edge of each stack and the casing wall, the spaces between the trays of each stack communicating with the central and outer passages, a humidifier and a heater at the bottom of the casing, means for supplying fresh air to the top of the casing, a fan at the top of the casing over the central passage, and an inverted truncated cone suspended from the casing top and projecting into the central passage, said fan and cone directing air downwardly through the central passage to the humidifier and the heater and said air rising in the outer passages and some of it being drawn through the spaces between the trays by suction created by the downward movement of the air in the central passage.

7. An incubator comprising a casing, a plurality of trays arranged in straight vertical stacks in the casing, the trays of each stack being spaced one above the other with the sides of the stacks substantially at right angles to the bottom of the casing, the stacks being arranged to provide a central vertical passage between the stacks and an outer vertical passage between the outer edge of each stack and the casing wall, the spaces between the trays of each stack communicating with the central and outer passages, a humidifier and a heater at the bottom of the casing, the humidifier including a water pan being supported above the bottom of the casing and below the lowermost trays of the stack in such a manner as to provide spaces for the circulation of air above and below the pan and at the side between the pan and the sides of the casing, and means for directing air downwardly through the central passage between the trays to the humidifier and heater, whereby the air is free to rise in the outer passage while some of it is drawn through the spaces between the trays by suction created by the downward movement of the air in the central passage.

8. The incubator as claimed in claim 7 in which the front of each tray is supported in a vertical wall.

JOHN STEPHEN KAZANTZEFF.